(12) United States Patent
Hofer

(10) Patent No.: US 7,667,740 B2
(45) Date of Patent: Feb. 23, 2010

(54) ELIMINATION OF MODULATED LIGHT EFFECTS IN ROLLING SHUTTER CMOS SENSOR IMAGES

(75) Inventor: Gregory Hofer, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 483 days.

(21) Appl. No.: 11/495,376

(22) Filed: Jul. 28, 2006

(65) Prior Publication Data

US 2008/0024633 A1    Jan. 31, 2008

(51) Int. Cl.
*H04N 9/73* (2006.01)
(52) U.S. Cl. .................. 348/226.1; 348/227.1; 348/296
(58) Field of Classification Search ... 348/226.1–229.1, 348/294–297
See application file for complete search history.

(56) References Cited

U.S. PATENT DOCUMENTS

| | | | |
|---|---|---|---|
| 6,295,085 B1 * | 9/2001 | Munson et al. | 348/226.1 |
| 6,519,002 B1 * | 2/2003 | Tomaszewski | 348/226.1 |
| 6,630,953 B1 * | 10/2003 | Toyoda et al. | 348/226.1 |
| 6,657,659 B1 * | 12/2003 | Van Rooy et al. | 348/226.1 |
| 6,771,305 B2 * | 8/2004 | Smith et al. | 348/84 |
| 7,034,870 B2 * | 4/2006 | Nagaoka et al. | 348/228.1 |
| 7,164,439 B2 * | 1/2007 | Yoshida et al. | 348/226.1 |
| 7,289,144 B2 * | 10/2007 | Arazaki, Shinichi | 348/228.1 |
| 2003/0081830 A1 * | 5/2003 | Sobol et al. | 382/167 |
| 2004/0165084 A1 * | 8/2004 | Yamamoto et al. | 348/226.1 |
| 2005/0093996 A1 * | 5/2005 | Kinoshita | 348/226.1 |
| 2007/0091201 A1 * | 4/2007 | Sasaki | 348/362 |
| 2007/0212024 A1 * | 9/2007 | Bourdon et al. | 386/94 |

* cited by examiner

*Primary Examiner*—Tuan Ho
*Assistant Examiner*—Don Nguyen

(57) ABSTRACT

Disclosed are digital imaging devices that embody a method for eliminating modulated light effects in rolling shutter CMOS sensor images. The digital imaging device comprises an image sensor utilizing an electronic rolling shutter, a processor and firmware for implementing the methods. Embodiments of the method comprise detecting the presence of light modulation and the frequency of the light modulation, and synchronizing the exposure times to the modulation cycle time.

6 Claims, 4 Drawing Sheets

ELIMINATION OF MODULATED LIGHT EFFECTS IN ROLLING SHUTTER CMOS SENSOR IMAGES

BACKGROUND

The present invention relates to digital imaging devices and related methods, and more particularly, to the elimination of modulated light effects in rolling shutter CMOS sensor images.

Due to the nature of the electronic rolling shutter readout used in CMOS image sensors, significant horizontal banding can occur in images taken in the presence of modulated lighting, such as fluorescent lights, for example. This is illustrated in FIG. 1. This problem affects liveview, video, and still image captures taken without a mechanical shutter.

More particularly, most digital still cameras that use CMOS sensors employ a rolling shutter readout, which means that the exposure and readout of each image row is staggered or shifted in time from a previous row. Due to this readout method, liveview and video images exhibit significant horizontal banding when imaging scenes illuminated with modulated light, such as fluorescent lighting. Still images taken without a mechanical shutter also exhibit this horizontal banding. This is one of a number of reasons that have necessitated the need for a mechanical shutter in digital still cameras that use CMOS sensors.

The use of a mechanical shutter eliminates this problem in still images. However, the disadvantage of this is the cost of the shutter mechanism. This is not the only problem standing in the way of eliminating the mechanical shutter. Other reasons requiring a mechanical shutter are to provide the minimum exposure time required for strobe shots and to minimize motion distortion.

Non-SLR (single lens reflex) CMOS based digital still cameras that do not have a mechanical shutter exhibit this problem in still image captures. It is believed that the image banding problem exists on all non-SLR CMOS based digital still cameras that have video and/or liveview capability or that do not utilize a mechanical shutter for still image captures.

U.S. Pat. No. 6,771,305 issued to Smith et al., as evidenced by its Abstract, for example, discloses a "method for eliminating the flicker of a light source such as a fluorescent light." This method captures images at an exposure time that is not synchronous to either of the two possible frequencies and then 1) performs a horizontal average of each line of the image (column 6, step 306), and 2) performs an FFT across the resulting averages (column 6, step 310). The results of the FFT are used to determine the light modulation frequency (column 6, step 312). The present application discloses different and improved techniques for eliminating the effects of modulated light sources on digital imaging devices such as digital cameras.

It would be desirable to be able to eliminate the effects of modulated light sources on digital cameras that use CMOS sensors employing a rolling shutter readout.

BRIEF DESCRIPTION OF THE DRAWINGS

The various features and advantages of disclosed embodiments may be more readily understood with reference to the following detailed description taken in conjunction with the accompanying drawings, wherein like reference numerals designate like structural elements, and in which.

DETAILED DESCRIPTION

Disclosed are methods that address the problem of modulated light effects in rolling shutter CMOS sensor images. Light modulation illuminating a scene is caused by the amplitude modulation of the light by the AC power supplying the light source. The resulting light modulation is synchronous with the AC power line frequency which is typically 50 Hz or 60 Hz. The disclosed methods eliminate such modulated light effects by synchronizing the exposure time to the modulation frequency of the modulated light source. For example, by setting the exposure times to a multiple of the light modulation cycle time, the horizontal banding can be eliminated in still and video image captures.

The disclosed methods either (1) capture images and performs DFT's for frequencies of interest on the columns of the images to determine the modulation frequency, which may be performed in two different ways, or (2) captures two sets of images, one set using an exposure time synchronous to one of the possible light modulation frequencies, and one set using an exposure time that is synchronous to the other possible light modulation frequency. Each set of images is analyzed for overall intensity variation between images and the set of images with the least amount of variation is determined. The frequency that the exposure time was synchronized to for that set of images is determined as the modulation frequency. None of these detection methods are disclosed in U.S. Pat. No. 6,771,305.

Figure 1:
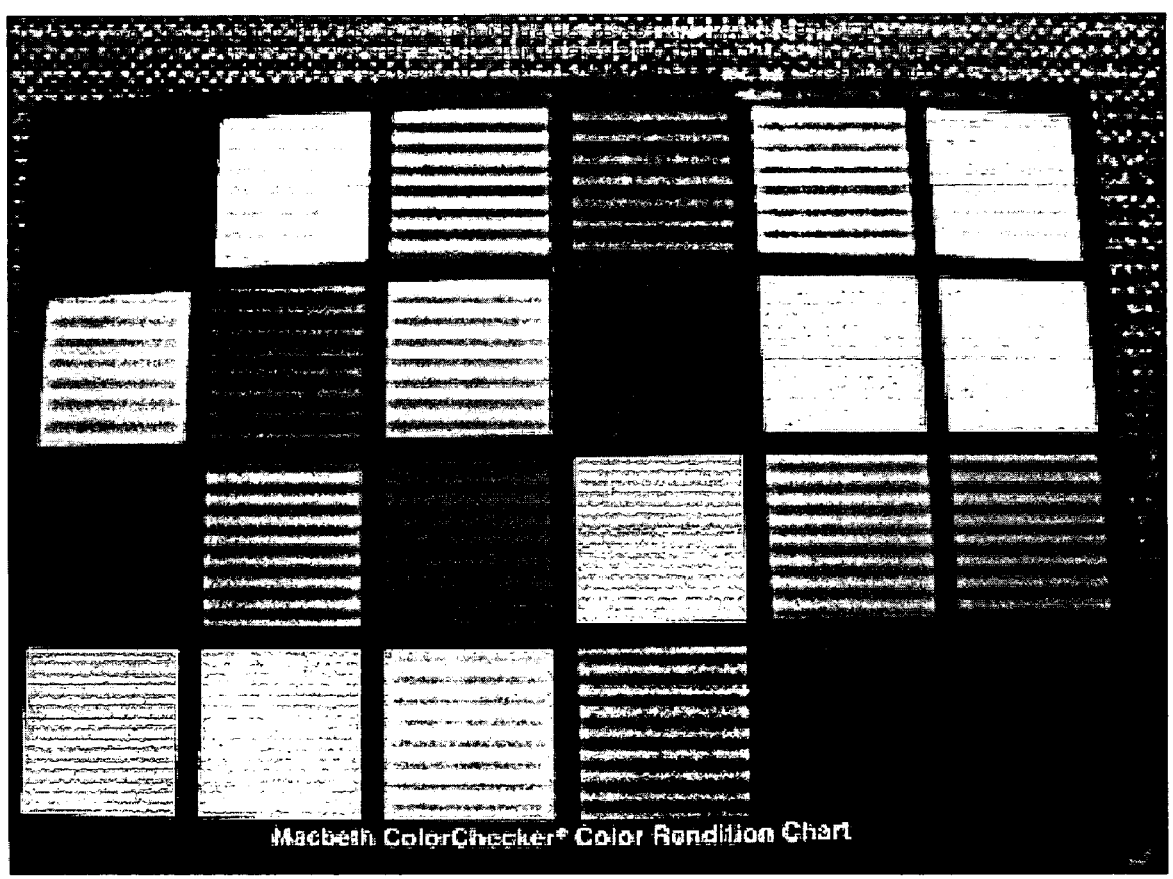
FIG. 1 illustrates horizontal banding that occurs when capturing images illuminated with a modulated light source using a digital camera having an electronic rolling shutter and CMOS sensor.

Referring to the drawing figures, FIG. 1 illustrates horizontal banding that occurs when capturing images illuminated with a modulated light source using a digital camera having an electronic rolling shutter and CMOS sensor. The modulated light source may be a fluorescent light connected to a 60 Hz AC power source, for example. Banding effects in the image are observed over a large range of exposure times, from less than 1 msec to over 100 msec. The effect diminishes somewhat with longer exposure times, but is still very noticeable. The intensity of the banding varies with the exact exposure time used and it was found that there was no banding if the exposure time was an exact multiple of 8.33 msec. The reason for this is described below.

The light intensity from common fluorescent lights is modulated at a frequency twice that of the AC line frequency and appears as a rectified sine wave. Phosphors with long decay times are used in fluorescent light bulbs in an attempt to reduce variations in luminance caused by the alternating current voltage supply.

Because of the different decay times used, some fluorescent lights exhibit very little modulation while others have large amounts of modulation. Also, some fluorescent lights have control circuits that excite the bulb at much higher frequencies than the line frequency to eliminate the light modulation.

Figure 2:
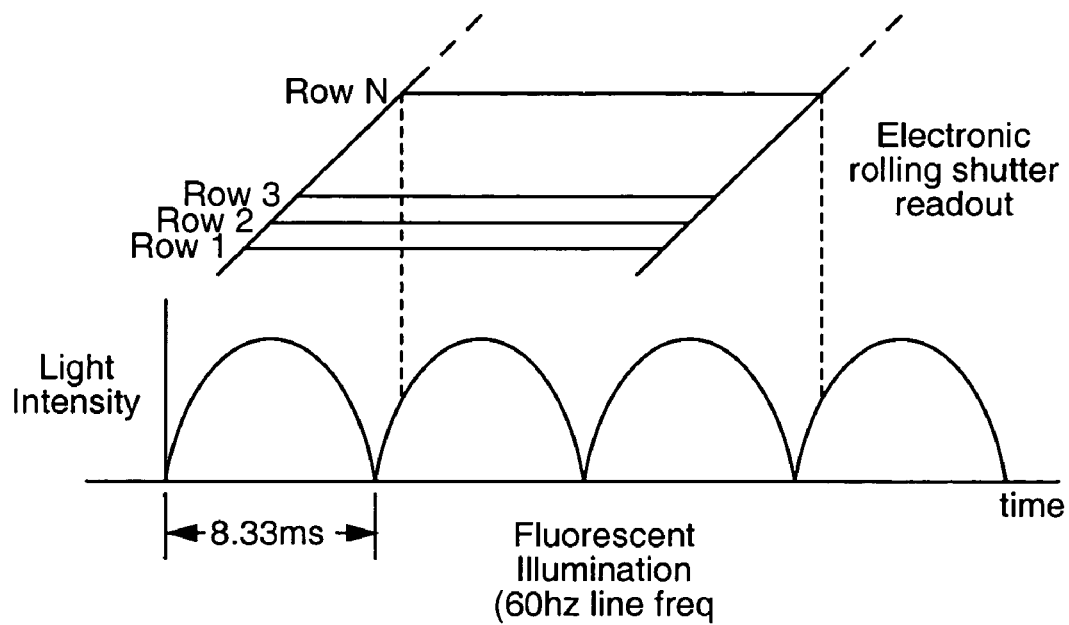
FIG. 2 shows an electronic rolling shutter readout of sensor rows in conjunction with a fluorescent modulated light waveform.

FIG. 2 shows an electronic rolling shutter readout of sensor rows in conjunction with a fluorescent modulated light waveform. The exposure time of each row is set to 1/60 sec (16.66 ms), or exactly at 2 modulation cycle times. The exposure time of each row is shifted by Trow from the previous row which results in the exposure of each row starting at a different point on the modulation cycle. Since the exposure time is an exact multiple of the modulation cycle time (8.33 msec), each row is exposed to or integrates two complete cycles, resulting in the same effective exposure for each row and no noticeable horizontal modulation banding in the image.

Figure 3:
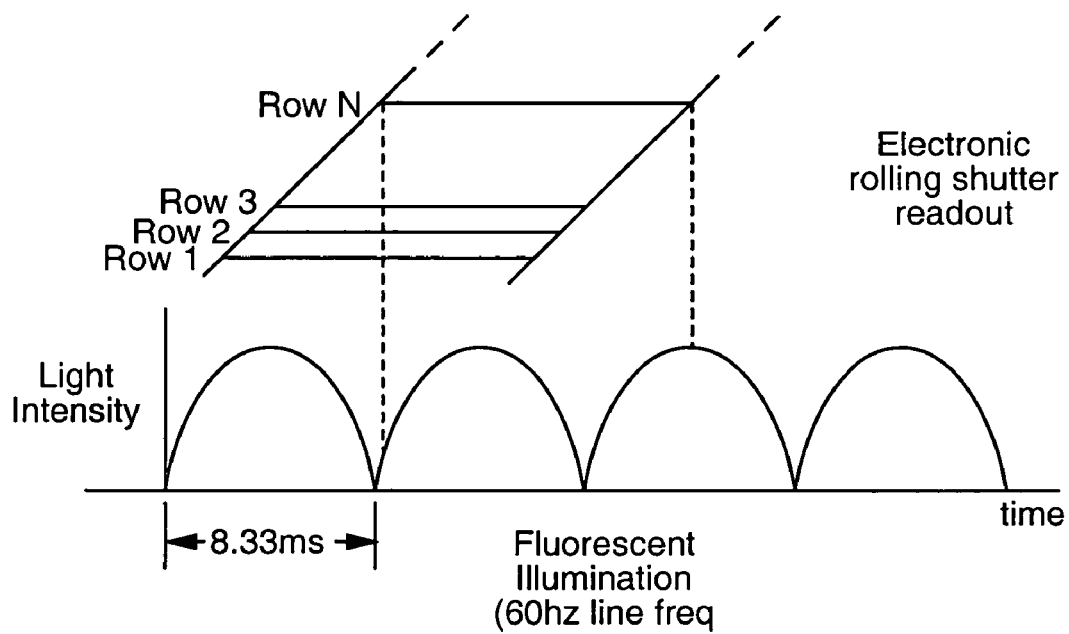
FIG. 3 shows the case where the exposure time is not a multiple of the light modulation cycle time.

FIG. 3 shows the case where the exposure time is not a multiple of the light modulation cycle time. In this case, each row is exposed to or integrates a different portion of the modulated light cycle which results in varying effective exposures for each row in the electronic rolling shutter sequence and noticeable horizontal banding as seen in the image shown in FIG. 1.

The image shown in FIG. 1 was captured with a Micron MI-5100 sensor with a clock frequency of 24 MHz. The difference in time between the start of exposure for the first row to the last row is around 340 msec. The number of modulation cycles that occur during this time is 340 msec/8.33 msec or about 41 cycles, which is about the number of horizontal bands seen from top to bottom in the image shown in FIG. 1.

Therefore, for liveview and video images, the solution to the problem of eliminating the effects of modulated light sources on digital cameras that use CMOS sensors employing a rolling shutter readout is to synchronize the exposure time to the most common AC modulation frequency, which is typically 60 Hz. In this way, the image banding problem is eliminated in countries using a 60 Hz AC line frequency, but not in countries using a 50 Hz line frequency. The problem would be solved in those countries using a 50 Hz line frequency by synchronizing the exposure time to the 50 Hz line frequency. An attempt to infer which AC line frequency is being used could be performed by using various country location cues such as language selection, cell location (camera phone), localization data, etc. The techniques disclosed herein, however, perform a direct measurement to determine the modulation frequency to eliminate the ambiguity of any such inference methods.

Figure 4A:
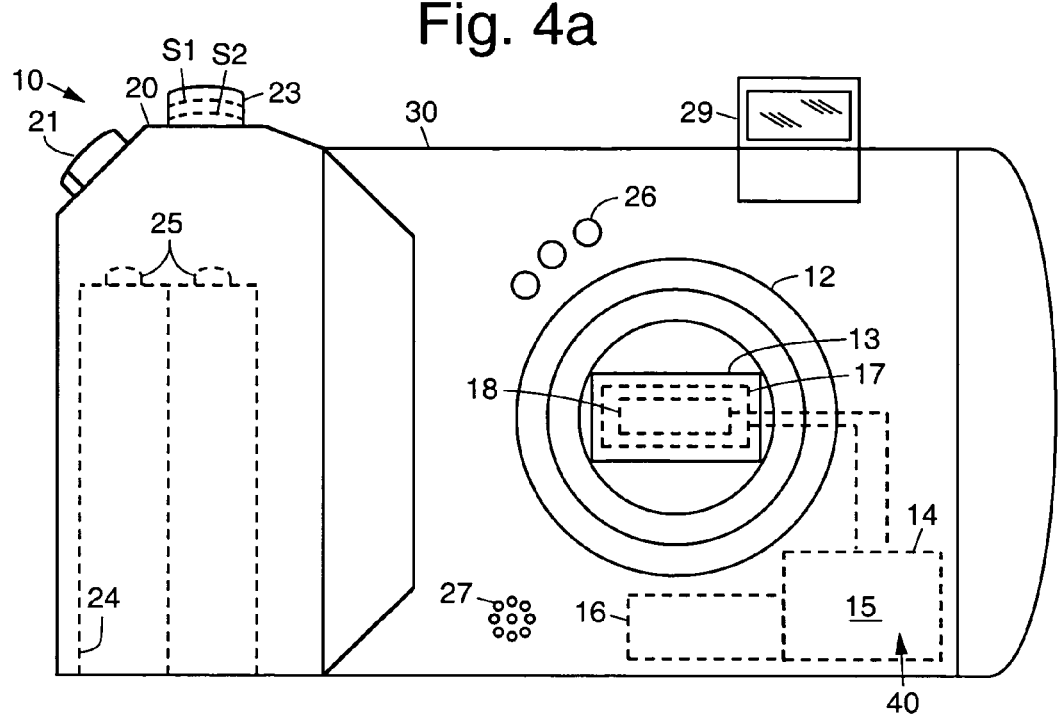
FIGS. 4a and 4b illustrates front and rear views, respectively, of an exemplary digital imaging device that may embody methods for eliminating horizontal image banding.
Figure 4B:
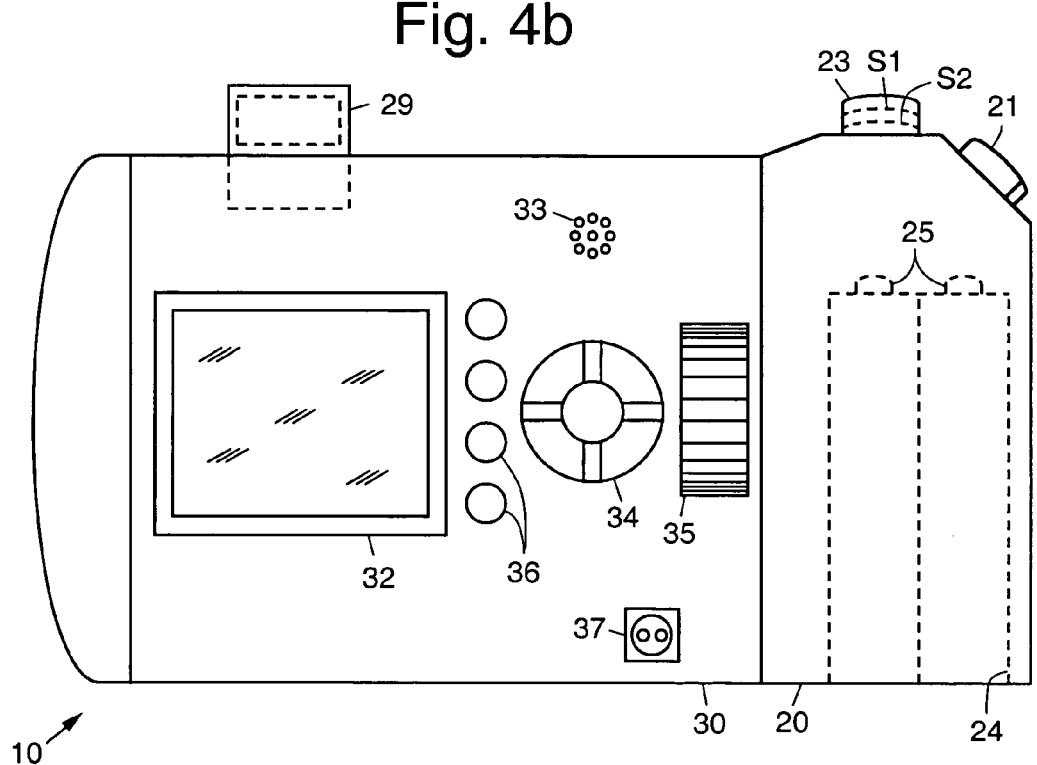

Referring to FIGS. 4a and 4b, they show front and back views, respectively, of an exemplary embodiment of a digital imaging device 10 that embodies methods 40 for eliminating horizontal image banding. The exemplary digital imaging device 10 comprises a handgrip section 20 and a body section 30. The handgrip section 20 includes a power button 21, a shutter button 23, and a battery compartment 24 for housing batteries 25. The shutter button 23 may be depressed so that it is at one of two positions, S1 and S2. The S1 position corresponds to a focus/exposure lock position, while the S2 position corresponds to an image capture or video position. A metering element 26 and microphone 27 may be disposed on a front surface of the digital imaging device 10. A pop-up flash 29 is located adjacent a top surface of the digital imaging device 10.

As is shown in FIG. 4b, a rear surface of the exemplary digital imaging device 10 includes an image display 32, such as a liquid crystal display (LCD) 32, for example, a rear microphone 33, a multipurpose direction selection pad 34, a zoom control switch 35, which may be either two buttons or a toggle switch that control(s) zooming in or out, a plurality of buttons 36 for setting functions of the digital imaging device 10, and an output port 37 for downloading images to an external display device or computer, for example.

The digital imaging device 10 also comprises a moveable lens or imaging optics 12, and an image sensor 13, such as a CMOS image sensor 13, for receiving images transmitted by the imaging optics 12 and capturing digital images. The image sensor 13 comprises an electronic rolling shutter 17 and a pixel array 18. A processor 14 is coupled to the image sensor 13 (and other control and input/output components). The processor 14 is coupled to image memory 16, which may include internal memory and removable memory. The processor 14 comprises firmware 15 including one or more algorithms that implement methods 40 for eliminating horizontal image banding. The processor 14 is connected in parallel to both the pixel array 18 and the electronic rolling shutter 17.

Figure 5:
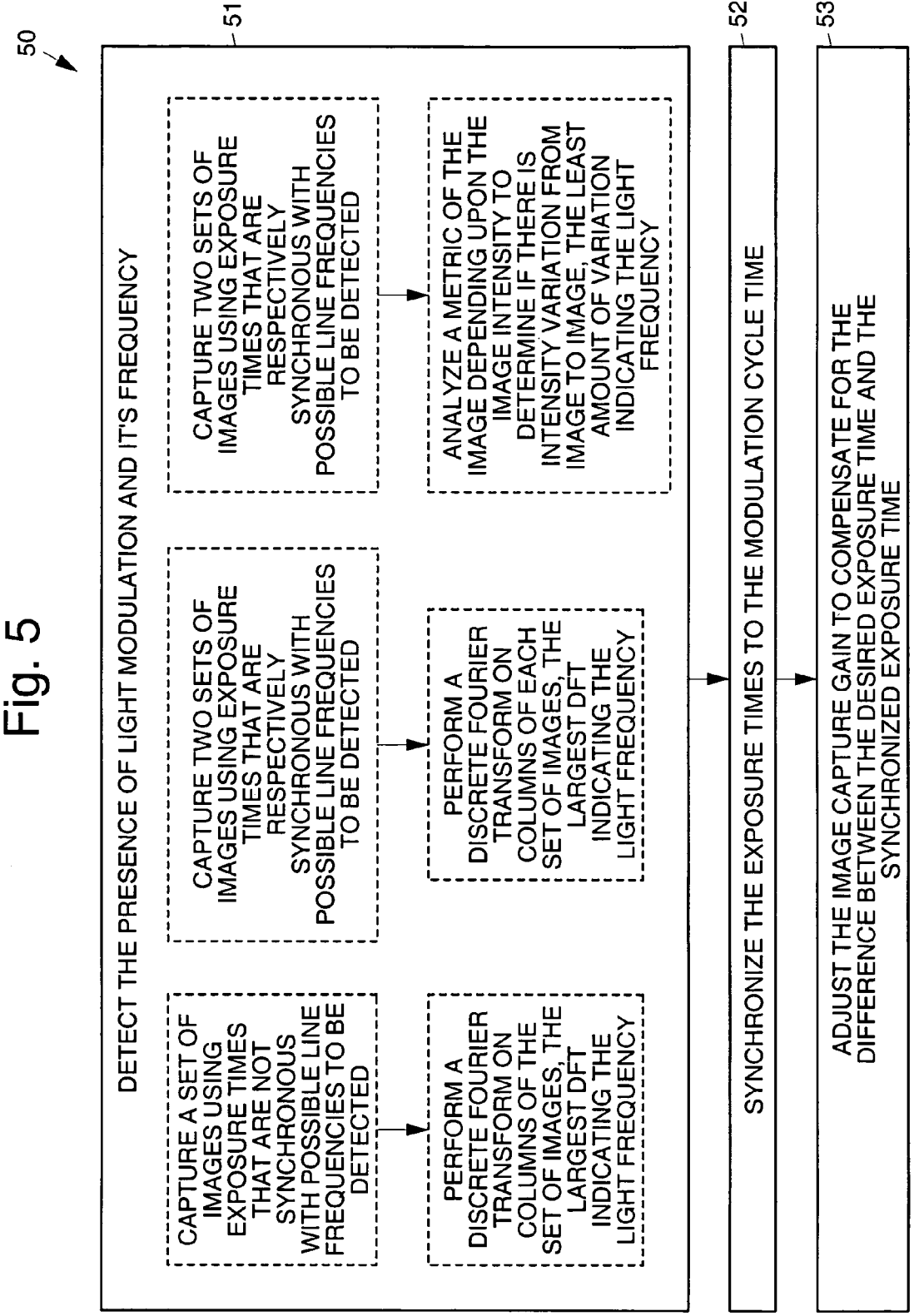
FIG. 5 is a flow diagram that illustrates an exemplary method for eliminating horizontal image banding in a digital camera having an electronic rolling shutter and CMOS sensor.

The solution for eliminating the horizontal image banding is a two-step procedure. FIG. 5 is a flow diagram that illustrates exemplary methods 10 for eliminating horizontal image banding in a digital camera having an electronic rolling shutter and CMOS sensor.

The presence of light modulation and it's frequency are detected 51. This may be done a number of ways. Three possible methods are discussed below. Two methods perform a discrete Fourier transform (DFT) on columns of images during liveview or video to measure the presence of the effects of I modulated light frequency (50 Hz or 60 Hz). A third method captures a series (set) of liveview or video images using exposure times that are synchronous with possible modulated light frequencies to be detected, and then analyzing a metric of the image depending upon the image intensity to determine if there is intensity variation from image to image. The exposure time that yields the least intensity variation between images indicates possible light modulation at that frequency.

More particularly, in a first method 10, one set of images is captured using an exposure time that is not synchronous with the (two) possible modulated light frequencies. Then, a discrete Fourier transform (DFT) is performed for both possible modulated light frequencies on columns of this set of images. The DFT is performed during liveview or video to measure the presence of the effects of light modulation (50 Hz or 60 Hz). The largest DFT indicates the frequency of the light modulation. When the DFT is performed on the columns of the image, the DFT result from each column of pixel data may be averaged together to arrive at a DFT result for the whole image. Also, the DFT may be performed on every Nth column to reduce computation time.

In a second method 10, two sets of images are captured. One set of images is captured using an exposure time that is synchronous with one possible light modulation frequency. The other set of images is captured using an exposure time that is synchronous with the other possible light modulation frequency. For each respective set of images, a DFT is performed on columns of the respective set of images for the light modulation frequency that the exposure time was not synchronized to, The DFT results from each set of images are compared and the largest DFT result indicates the frequency of the light modulation. When the DFT is performed on the columns of the image, the DFT result from each column of pixel data may be averaged together to arrive at a DFT result for the whole image. Also, the DFT may be performed on every Nth column to reduce computation time.

In a third method 10, two sets of images are captured. One set of images is captured using an exposure time that is synchronous with one of the possible light modulation frequencies. The other set of images is captured using an exposure time that is synchronous with the other possible light modulation frequency. Each set of images is analyzed for overall intensity variation between images within the set, and the set of images with the least amount of intensity variation is determined. The frequency that the exposure time was synchronized to for that set of images is determined to be the modulation frequency. The overall image intensity variation may be determined by computing an average pixel value for each image and then determining the amount of variation in the average pixel values by looking at the minimum/maximum of the average values or computing a standard deviation of the average values.

The exposure times are then synchronized 52 to the modulation cycle time. In particular, the exposure time is set to a multiple of the period of the detected modulation frequency. Once the presence and frequency of light modulation are determined, the exposure times of all image captures is forced to be an integer multiple of the modulation cycle time. Because of this, the image capture gain is adjusted 53 to compensate for the difference between the desired exposure time and the synchronized exposure time.

The method 50 eliminates significant horizontal banding in liveview and video images that exists when the images are taken in the presence of modulated lighting with non-SLR CMOS sensor digital still cameras. The method 50 also eliminates one of the problems that requires a mechanical shutter to be used in still image captures in these cameras.

Thus, digital imaging devices and methods for eliminating modulated light effects in rolling shutter CMOS sensor images have been disclosed. It is to be understood that the above-described embodiments are merely illustrative of some of the many specific embodiments that represent applications of the principles described herein. Clearly, numerous and other arrangements can be readily devised by those skilled in the art without departing from the scope of the invention.

What is claimed is:

1. A method for use in a digital imaging device having an image sensor, an electronic rolling shutter, a processor and firmware for implementing the method, the method comprising:
   detecting the presence of light modulation and the frequency of the light modulation using an exposure time that is synchronous to possible line frequencies used to generate the light modulation; and
   synchronizing the exposure times to the modulation cycle time;
   wherein the presence of light modulation and frequency is detected by:
   capturing a set of images using exposure times that are not synchronous with possible light modulation frequencies to be detected;
   performing a discrete Fourier transform (DFT) on columns of images of the set to measure the presence of the effects of light modulation frequency modulation, the largest DFT indicating the frequency of the light modulation; and
   wherein, once the presence and frequency of light modulation are determined, the exposure times of all image captures is forced to be an integer multiple of the modulation cycle time.

2. The method recited in claim 1 further comprising:
   adjusting the image capture gain to compensate for the difference between the desired exposure time and the synchronized exposure time.

3. A digital imaging device comprising:
   an image sensor comprising an electronic rolling shutter;
   a processor coupled to the image sensor and electronic rolling shutter; and
   firmware that runs on the processor for eliminating modulated light effects in images generated by the device that detects the presence of light modulation and the frequency of the light modulation using an exposure time that is synchronous to possible light modulation frequencies, and synchronizes the exposure times to the modulation cycle time
   wherein the presence of light modulation and the frequency of the light modulation is detected by:
   capturing sets of images where each set of images uses an exposure time that is synchronous with one of the possible light modulation frequencies to be detected;
   performing a discrete Fourier transform (DFT) on columns of images of each set to measure the presence of the effects of light modulation, the set with the largest DFT indicating the frequency of the light modulation; and
   wherein, once the presence and frequency of light modulation are determined, the exposure times of all image captures is forced to be an integer multiple of the modulation cycle time.

4. The device recited in claim 3 wherein the firmware further comprises:
   adjusting the image capture gain to compensate for the difference between the desired exposure time and the synchronized exposure time.

5. Apparatus comprising:
   image sensor means for comprising electronic rolling shutter means for capturing images;
   processor means coupled to the image sensor means and electronic rolling shutter means for processing the captured images; and
   firmware that runs on the processor means for eliminating modulated light effects in images generated by the apparatus that determines the presence of light modulation and the frequency of the light modulation using an exposure time that is synchronous to the light modulation frequencies, and synchronizes the exposure times to the modulation cycle time;
   wherein the presence of light modulation and frequency is detected by:
   capturing sets of images where each set of images uses an exposure time that is synchronous with one of the possible light modulation frequencies to be detected; and
   analyzing a metric of the image depending upon the image intensity to determine if there is intensity variation from image to image of each set, the set with the least amount of variation between images indicating the frequency of the light modulation; and
   wherein, once the presence and frequency of light modulation are determined, the exposure times of all image captures is forced to be an integer multiple of the modulation cycle time.

6. The apparatus recited in claim 5 wherein the firmware further comprises:
   adjusting the image capture gain to compensate for the difference between the desired exposure time and the synchronized exposure time.

* * * * *

UNITED STATES PATENT AND TRADEMARK OFFICE
CERTIFICATE OF CORRECTION

PATENT NO. : 7,667,740 B2 Page 1 of 1
APPLICATION NO. : 11/495376
DATED : February 23, 2010
INVENTOR(S) : Gregory Hofer It is certified that error appears in the above-identified patent and that said Letters Patent is hereby corrected as shown below:

In column 6, line 11, in Claim 3, delete "time" and insert -- time; --, therefor.

Signed and Sealed this

Twentieth Day of July, 2010

David J. Kappos
*Director of the United States Patent and Trademark Office*